United States Patent Office.

RUFUS NORWOOD, OF BALTIMORE, MARYLAND.

Letters Patent No. 98,791, dated January 11, 1870.

IMPROVED CONCRETE PAVING-BLOCK.

The Schedule referred to in these Letters Patent and making part of the same.

*To all whom it may concern:*

Be it known that I, RUFUS NORWOOD, of the city of Baltimore, in the State of Maryland, have invented a new and improved Concrete for Paving-Blocks, Tiles, and other purposes; and I do hereby declare that the following is a full, clear, and exact description thereof.

The improved concrete is composed of, asphaltic cement, or residuum of coal-tar, sixteen parts; rosin, ten parts; coal-tar, sixteen parts; lime, sixteen parts; and sand, forty-two parts, mixed together in the following manner:

I put into a kettle, of suitable capacity, the rosin and asphaltum, and apply heat until these substances attain the boiling-point. I then add to the hot liquid a mixture of lime and hot sand, and then the coal-tar, after which the full quantity of hot sand is added, and the compound is ready for the moulds.

I use the asphaltum (bitumen) because it is impervious to water; the rosin, because it gives hardness and toughness to the compound; the coal-tar, because it will reduce the above-mentioned substances, viz, the asphaltum and rosin, to the proper consistency; and I employ lime, because of its absorbent, drying, and deodorizing-properties. The sand is added to give body and solidity to the whole.

By using coal-tar in about the proportions described, in combination with rosin and asphaltum, I am enabled to employ such a large percentage of sand that the compound is rendered very solid and durable.

The coal-tar renders the heated asphaltum and rosin so thin that the sand can be intimately mixed with them, and the compound thereby rendered homogeneous.

The flasks for moulding the compound in the form of bricks or tiles may be of any desired size and shape, with their sides flaring, to allow the ready withdrawal of the moulded bricks or tiles from the flasks, and also to allow the insertion of cement, of any suitable kind, between the edges of the bricks or tiles when laying them down.

The bricks or tiles produced of my improved compound become exceedingly hard when cool, and are so tough, in consequence of the rosin used, that they will not be liable to crack or scale off under very rough usage.

The bricks or tiles become solid and fit for laying down as soon as they are cool, which is chiefly owing to the lime forming one of the ingredients of the compound.

I prefer to adopt the relative proportions herein named of the within-described ingredients, and believe the best results can be thereby produced; but I do not confine myself to the precise proportions stated. Nor do I confine myself to the use of fine grit or sand, as fine or coarse gravel may be mixed with fine sand, and thus added to the other ingredients.

In the process of laying down the bricks or tiles, their edges are cemented together by pouring the raw heated material into the seams or channels which are left between the edges of the bricks or tiles in consequence of the bevelling of the same while moulding them.

Having described my invention,

I claim as new, and desire to secure by Letters Patent—

1. An improved concrete, composed of the ingredients, mixed together in about the proportions, and in the manner described.

2. Bricks or tiles composed of the concrete described.

RUFUS NORWOOD.

Witnesses:
W. ALEX. ABEY,
P. F. YOUNG.